(12) United States Patent
Ding et al.

(10) Patent No.: US 11,919,273 B2
(45) Date of Patent: *Mar. 5, 2024

(54) COMPOSITE STRUCTURE

(71) Applicant: Ticona LLC, Florence, KY (US)

(72) Inventors: Junchen Ding, Shanghai (CN); Yanjun Li, Shanghai (CN); Rong Luo, Florence, KY (US)

(73) Assignee: Ticona LLC, Florence, KY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/861,309

(22) Filed: Jul. 11, 2022

(65) Prior Publication Data
US 2022/0355576 A1  Nov. 10, 2022

Related U.S. Application Data

(63) Continuation of application No. 15/550,187, filed as application No. PCT/CN2016/077222 on Mar. 24, 2016, now Pat. No. 11,383,491.

(51) Int. Cl.
| | |
|---|---|
| B32B 15/08 | (2006.01) |
| B29C 45/14 | (2006.01) |
| B32B 7/04 | (2019.01) |
| B32B 15/082 | (2006.01) |
| B32B 15/085 | (2006.01) |
| B32B 15/088 | (2006.01) |
| B32B 15/09 | (2006.01) |
| B32B 15/092 | (2006.01) |
| B32B 15/095 | (2006.01) |
| B32B 15/18 | (2006.01) |
| B32B 15/20 | (2006.01) |
| B32B 27/06 | (2006.01) |
| B32B 27/18 | (2006.01) |
| B32B 27/20 | (2006.01) |
| B32B 27/24 | (2006.01) |
| B32B 27/28 | (2006.01) |
| B32B 27/30 | (2006.01) |
| B32B 27/32 | (2006.01) |
| B32B 27/34 | (2006.01) |
| B32B 27/36 | (2006.01) |
| B32B 27/38 | (2006.01) |
| B32B 27/40 | (2006.01) |
| C08G 59/06 | (2006.01) |
| C08K 7/14 | (2006.01) |
| C08L 33/06 | (2006.01) |
| C08L 81/04 | (2006.01) |

(Continued)

(52) U.S. Cl.
CPC ........ *B32B 15/08* (2013.01); *B29C 45/14008* (2013.01); *B29C 45/1418* (2013.01); *B32B 7/04* (2013.01); *B32B 15/082* (2013.01); *B32B 15/085* (2013.01); *B32B 15/088* (2013.01); *B32B 15/09* (2013.01); *B32B 15/092*
(2013.01); *B32B 15/095* (2013.01); *B32B 15/18* (2013.01); *B32B 15/20* (2013.01); *B32B 27/06* (2013.01); *B32B 27/18* (2013.01); *B32B 27/20* (2013.01); *B32B 27/24* (2013.01); *B32B 27/281* (2013.01); *B32B 27/285* (2013.01); *B32B 27/286* (2013.01); *B32B 27/288* (2013.01); *B32B 27/302* (2013.01); *B32B 27/32* (2013.01); *B32B 27/34* (2013.01); *B32B 27/36* (2013.01); *B32B 27/38* (2013.01); *B32B 27/40* (2013.01); *C08G 59/063* (2013.01); *C08K 7/14* (2013.01); *C08L 33/068* (2013.01); *C08L 81/04* (2013.01); *B29D 99/006* (2013.01); *B29K 2081/04* (2013.01); *B29K 2705/02* (2013.01); *B32B 2250/02* (2013.01); *B32B 2262/10* (2013.01); *B32B 2262/101* (2013.01); *B32B 2262/108* (2013.01); *B32B 2264/10* (2013.01); *B32B 2264/102* (2013.01); *B32B 2270/00* (2013.01); *B32B 2307/3065* (2013.01); *B32B 2307/4026* (2013.01); *B32B 2307/54* (2013.01); *B32B 2307/542* (2013.01); *B32B 2307/546* (2013.01); *B32B 2307/558* (2013.01); *B32B 2307/7145* (2013.01); *B32B 2457/00* (2013.01); *B32B 2457/16* (2013.01); *B32B 2597/00* (2013.01); *C08G 2120/00* (2013.01); *C08K 2201/002* (2013.01); *C08L 2203/20* (2013.01)

(58) Field of Classification Search
CPC ......... B32B 15/08; B32B 27/24; B32B 27/28; B32B 27/38
USPC ...................................................... 264/259
See application file for complete search history.

(56) References Cited

U.S. PATENT DOCUMENTS

| | | | |
|---|---|---|---|
| 4,418,029 A | 11/1983 | Reed et al. | |
| 4,708,983 A | 11/1987 | Liang | |

(Continued)

FOREIGN PATENT DOCUMENTS

| | | | |
|---|---|---|---|
| CN | 1718635 A | 1/2006 | |
| CN | 103554914 A | 2/2014 | |

(Continued)

OTHER PUBLICATIONS

Abstract of Chinese Patent—CN101469131, Jul. 1, 2009, 1 page.

(Continued)

*Primary Examiner* — Tahseen Khan
(74) *Attorney, Agent, or Firm* — Dority & Manning, P.A.

(57) ABSTRACT

A composite structure comprising a resinous component that is adhered to a surface of a metal component is provided. The resinous component is formed from a polymer composition that comprises a polyarylene sulfide, inorganic fibers, and an impact modifier. The inorganic fibers have an aspect ratio of from about 1.5 to about 10.

14 Claims, No Drawings

(51) Int. Cl.
  *B29D 99/00* (2010.01)
  *B29K 81/00* (2006.01)
  *B29K 705/02* (2006.01)

(56) References Cited

U.S. PATENT DOCUMENTS

| | | | |
|---|---|---|---|
| 4,871,810 A | 10/1989 | Saltman | |
| 5,011,887 A | 4/1991 | Sasaki et al. | |
| 5,071,907 A | 12/1991 | Nakata et al. | |
| 5,157,070 A | 10/1992 | Orikasa et al. | |
| 5,191,020 A | 3/1993 | Masamoto et al. | |
| 5,219,920 A | 6/1993 | Yamamoto et al. | |
| 5,258,450 A | 11/1993 | Nakata et al. | |
| 5,270,375 A | 12/1993 | Yamamoto et al. | |
| 5,281,665 A | 1/1994 | Fukui et al. | |
| 5,288,798 A | 2/1994 | Koshirai et al. | |
| 5,288,817 A | 2/1994 | Yamamoto et al. | |
| 5,324,796 A | 6/1994 | Han | |
| 5,604,287 A | 2/1997 | Yamao | |
| 5,723,542 A | 3/1998 | Hwang et al. | |
| 6,072,012 A | 6/2000 | Juen et al. | |
| 6,130,292 A | 10/2000 | Harwood et al. | |
| 6,166,137 A | 12/2000 | Brown et al. | |
| 6,579,936 B1* | 6/2003 | Kawashima | C08L 81/02 525/65 |
| 6,608,136 B1 | 8/2003 | Dean et al. | |
| 6,699,946 B1 | 3/2004 | Lambla et al. | |
| 6,849,697 B2 | 2/2005 | Lambla et al. | |
| 6,960,628 B2 | 11/2005 | Matsuoka et al. | |
| 7,173,090 B2 | 2/2007 | Akiyama et al. | |
| 7,750,111 B2 | 7/2010 | Horiuchi et al. | |
| 7,858,172 B2 | 12/2010 | Imaizumi et al. | |
| 7,863,378 B2 | 1/2011 | Nishihara et al. | |
| 7,960,473 B2 | 6/2011 | Kobayashi et al. | |
| 7,989,079 B2 | 8/2011 | Lee et al. | |
| 8,133,929 B2 | 3/2012 | Hoefflin et al. | |
| 8,324,308 B2 | 12/2012 | Kinouchi | |
| 8,487,042 B2 | 7/2013 | Okubo et al. | |
| 8,603,599 B2 | 12/2013 | Matsuo et al. | |
| 8,663,764 B2 | 3/2014 | Luo et al. | |
| 8,703,029 B2 | 4/2014 | Takada et al. | |
| 8,779,051 B2 | 7/2014 | Kisin et al. | |
| 8,791,189 B2 | 7/2014 | Agarwal et al. | |
| 8,834,085 B2 | 9/2014 | Schneider et al. | |
| 8,852,707 B2 | 10/2014 | Nishikawa et al. | |
| 8,975,305 B2 | 3/2015 | Topolkaraev et al. | |
| 9,074,096 B2 | 7/2015 | Okubo et al. | |
| 9,166,212 B2 | 10/2015 | Naritomo et al. | |
| 9,221,959 B2 | 12/2015 | Elmore et al. | |
| 9,365,718 B2 | 6/2016 | Luo et al. | |
| 9,493,646 B2 | 11/2016 | Luo et al. | |
| 9,494,260 B2 | 11/2016 | Luo et al. | |
| 9,494,262 B2 | 11/2016 | Luo et al. | |
| 9,611,388 B2 | 4/2017 | Watanable et al. | |
| 9,650,515 B2 | 5/2017 | Kang et al. | |
| 9,718,225 B2 | 8/2017 | Luo et al. | |
| 9,758,674 B2 | 9/2017 | Luo et al. | |
| 9,770,884 B2* | 9/2017 | Gong | B32B 9/005 |
| 9,771,465 B2 | 9/2017 | Ichinose et al. | |
| 9,938,407 B2 | 4/2018 | Unohara et al. | |
| 11,383,491 B2* | 7/2022 | Ding | B29C 45/14008 |
| 2009/0280347 A1 | 11/2009 | Yu | |
| 2012/0037397 A1 | 2/2012 | Mhetar | |
| 2013/0035440 A1 | 2/2013 | Nishikawa et al. | |
| 2013/0071638 A1* | 3/2013 | Luo | B32B 7/023 428/212 |
| 2013/0269977 A1 | 10/2013 | Luo et al. | |
| 2014/0316041 A1 | 10/2014 | Mehta | |
| 2015/0064437 A1* | 3/2015 | Luo | B29C 45/0005 264/319 |
| 2015/0197605 A1* | 7/2015 | Lee | C08L 81/02 528/389 |
| 2015/0225547 A1* | 8/2015 | Tu | C08K 7/14 428/220 |
| 2015/0225567 A1* | 8/2015 | Miller | C08L 81/04 524/502 |
| 2016/0122528 A1* | 5/2016 | Kobayashi | C08J 5/249 523/468 |
| 2016/0208081 A1 | 7/2016 | Peng et al. | |
| 2016/0340473 A1 | 11/2016 | Lee et al. | |
| 2016/0376439 A1 | 12/2016 | Tomoda | |
| 2017/0058124 A1 | 3/2017 | Luo et al. | |
| 2017/0059062 A1 | 3/2017 | Luo et al. | |
| 2017/0096557 A1 | 4/2017 | Ohnishi et al. | |
| 2017/0121525 A1 | 5/2017 | Luo et al. | |
| 2017/0166747 A1 | 6/2017 | Tu et al. | |
| 2017/0166748 A1 | 6/2017 | Luo et al. | |
| 2017/0369705 A1 | 12/2017 | Luo et al. | |
| 2018/0015648 A1 | 1/2018 | Luo et al. | |
| 2019/0062505 A1 | 2/2019 | Lee et al. | |

FOREIGN PATENT DOCUMENTS

| | | |
|---|---|---|
| CN | 103965642 A | 8/2014 |
| CN | 104672903 A | 6/2015 |
| DE | 4016059 A1 | 11/1991 |
| EP | 0 246 620 A2 | 11/1987 |
| EP | 0 288 308 B1 | 4/1988 |
| EP | 0 376 616 B1 | 7/1990 |
| EP | 0 389 905 A1 | 10/1990 |
| EP | 0 473 962 B1 | 8/1991 |
| EP | 0 480 426 A1 | 10/1991 |
| EP | 0 732 366 A2 | 9/1996 |
| EP | 3 252 106 A1 | 12/2017 |
| JP | S 6227459 | 2/1987 |
| JP | S 62268612 | 11/1987 |
| JP | S 63189457 | 8/1988 |
| JP | H 01240566 | 9/1989 |
| JP | H 02225565 | 9/1990 |
| JP | H 02286746 | 11/1990 |
| JP | H 03140368 | 6/1991 |
| JP | H 0472356 | 3/1992 |
| JP | H 059385 | 1/1993 |
| JP | H 06239972 | 8/1994 |
| JP | H 0753869 | 2/1995 |
| JP | H 08337719 | 12/1996 |
| JP | H 10219026 A | 8/1998 |
| JP | H 11130961 | 5/1999 |
| JP | H 11349813 | 12/1999 |
| JP | 2000001615 | 1/2000 |
| JP | 2000103963 | 4/2000 |
| JP | 2000186209 | 7/2000 |
| JP | 2004217895 A | 8/2004 |
| JP | 2005336229 A | 12/2005 |
| JP | 2006045390 | 2/2006 |
| JP | 2006063110 A | 3/2006 |
| JP | 2006328291 | 12/2006 |
| JP | 4032563 B2 | 1/2008 |
| JP | 2008144002 | 6/2008 |
| JP | 2008260830 | 10/2008 |
| JP | 2009096881 | 5/2009 |
| JP | 4297772 B | 7/2009 |
| JP | 2009155419 A | 7/2009 |
| JP | 2009235305 | 10/2009 |
| JP | 2010505025 | 2/2010 |
| JP | 2010195874 | 9/2010 |
| JP | 4600015 B2 | 12/2010 |
| JP | 4600016 B2 | 12/2010 |
| JP | 2011016942 A | 1/2011 |
| JP | 4626951 B2 | 2/2011 |
| JP | 4633384 B2 | 2/2011 |
| JP | 4633390 | 2/2011 |
| JP | 2011026439 | 2/2011 |
| JP | 2011185340 | 9/2011 |
| JP | 4912620 B2 | 4/2012 |
| JP | 201213584 A | 7/2012 |
| JP | 5031175 B2 | 9/2012 |
| JP | 5124932 B2 | 1/2013 |
| JP | 2013035950 A | 2/2013 |
| JP | 5156772 B2 | 3/2013 |
| JP | 2013112783 A | 6/2013 |
| JP | 5243077 B2 | 7/2013 |
| JP | 2013133374 | 7/2013 |

(56) References Cited

FOREIGN PATENT DOCUMENTS

| | | | |
|---|---|---|---|
| JP | 2013194196 | | 9/2013 |
| JP | 5310326 | B2 | 10/2013 |
| JP | 5339912 | B2 | 11/2013 |
| JP | 2014055219 | | 3/2014 |
| JP | 2014065774 | A | 4/2014 |
| JP | 2014065841 | A | 4/2014 |
| JP | 5540778 | B2 | 7/2014 |
| JP | 2014177571 | | 9/2014 |
| JP | 2014189573 | | 10/2014 |
| JP | 2014208444 | A | 11/2014 |
| JP | 2014214203 | A | 11/2014 |
| JP | 2015083625 | A | 4/2015 |
| JP | 2017066344 | A | 4/2017 |
| JP | 2017066374 | A | 4/2017 |
| JP | 2018053003 | A | 4/2018 |
| JP | 2018053118 | A | 4/2018 |
| JP | 2018162388 | A | 10/2018 |
| KR | 20150072376 | A | 6/2015 |
| WO | WO 94/16018 | A1 | 7/1994 |
| WO | WO 2008/038512 | A1 | 4/2008 |
| WO | WO 2010/075337 | A1 | 7/2010 |
| WO | WO 2010/111455 | A2 | 9/2010 |
| WO | WO 2013/125495 | A1 | 8/2013 |
| WO | WO 2014/143177 | A1 | 9/2014 |
| WO | WO-2015019965 A1 * | 2/2015 | ......... C08G 59/5033 |
| WO | WO 2015/031232 | A1 | 3/2015 |
| WO | WO 2015/064499 | A1 | 5/2015 |
| WO | WO 2015/122941 | A1 | 8/2015 |
| WO | WO 2015/134860 | A1 | 9/2015 |
| WO | WO 2015/147916 | A1 | 10/2015 |
| WO | WO 2017/010364 | A1 | 1/2017 |
| WO | WO 2017/057558 | A1 | 4/2017 |
| WO | WO 2017/057559 | A1 | 4/2017 |

OTHER PUBLICATIONS

Abstract of Chinese Patent—CN104072992, Oct. 1, 2014, 1 page.
Abstract of Chinese Patent—CN104231627, Dec. 24, 2014, 1 page.
Abstract of Japanese Patent—JPS62185845, Aug. 14, 1987, 2 pages.
Abstract of WO Patent—WO 2015/045724 A1, Apr. 2, 2015, 1 page.
ASTM D1652-11e1, Standard Test Method for Epoxy Content of Epoxy Resin (Year: 2012).
Fiber, Apr. 28, 2013, Wikipedia (Year: 2013).
International Search Report and Written Opinion for PCT/CN2016/077222 dated Nov. 7, 2016, 13 pages.
Paper—Ryan et al., "Ultra High Molecular Weight Functional Siloxane Additives in Polymers: Effects on Processing and Properties," *Dow Corning*, 2001, 16 pages.
Product Information on Dow Corning® MB50-314, Masterbatch, from Dow Corning, 2001, 2 pages.
Technical Data Sheet for EPON™ Resin 1002F from Hexion, Inc., Sep. 2007, 2 pages.
Technical Data Sheet on EPON™ Resin 1001F from Hexion Inc., Sep. 1, 2007, 3 pages.

\* cited by examiner

COMPOSITE STRUCTURE

RELATED APPLICATION

The present application is a continuation of U.S. application Ser. No. 15/550,187 having a filing date of Aug. 10, 2017 which is the national stage entry of International Patent Application No. PCT/CN2016/077222 having a filing date of Mar. 24, 2016, which are incorporated herein in their entirety by reference thereto.

BACKGROUND OF THE INVENTION

Housings of portable electronic devices, such as mobile phones and tablets, often employ metal components (e.g., aluminum) to enhance strength and stability. In many cases, the metal component is adhered to a plastic material to form a composite that has improved flexibility and functionality. For instance, because metals exhibit electromagnetic interference ("EMI") shielding, the plastic material can allow wireless signals to be received and transmitted through the housing. While providing certain benefits, the presence of the plastic material can also lead to various complications. For example, the housing is typically heated during application of a surface coating. Due to the significantly different thermal characteristics of the plastic and metal, such heating can result in a poor surface interface between the materials. This poor interface contributes to the need for an additional number of surface coatings to help achieve good bonding between the materials and a uniform appearance. As such, a need currently exists for a plastic-metal composite structure that is able to better to remain bonded together during manufacture and use.

SUMMARY OF THE INVENTION

In accordance with one embodiment of the present invention, a composite structure is disclosed that comprises a resinous component that is adhered to a surface of a metal component. The resinous component is formed from a polymer composition that comprises a polyarylene sulfide, inorganic fibers, and an impact modifier. The inorganic fibers have an aspect ratio of from about 1.5 to about 10, the aspect ratio being defined as the cross-sectional width of the fibers divided by the cross-sectional thickness of the fibers.

Other features and aspects of the present invention are set forth in greater detail below.

DETAILED DESCRIPTION

It is to be understood by one of ordinary skill in the art that the present discussion is a description of exemplary embodiments only, and is not intended as limiting the broader aspects of the present invention.

Generally speaking, the present invention is directed to a composite structure that contains a resinous component that is adhered to a surface of a metal component. By carefully controlling the particular nature of the polymer composition used to form the resinous component, the present inventors have discovered that the resulting composite structure can achieve significantly improved adhesion and mechanical properties (e.g., impact strength). More particularly, the polymer composition contains a polyarylene sulfide and an impact modifier that can significantly enhance the mechanical properties of the composite structure. The polymer composition also contains inorganic fibers having a relatively flat cross-sectional dimension in that they have an aspect ratio (i.e., cross-sectional width divided by cross-sectional thickness) of from about 1.5 to about 10, in some embodiments from about 2 to about 8, and in some embodiments, from about 3 to about 5. When such flat fibers are employed, the present inventors have discovered that they can significantly improve the ability of the composition to adhere to metal components.

Various embodiments of the present invention will now be described in greater detail below.

I. Resinous Component

A. Polyarylene Sulfide

Polyarylene sulfides typically constitute from about 35 wt. % to about 95 wt. %, in some embodiments from about 40 wt. % to about 85 wt. %, and in some embodiments, from about 50 wt. % to about 80 wt. % of the polymer composition. The polyarylene sulfide(s) employed in the composition generally have repeating units of the formula:

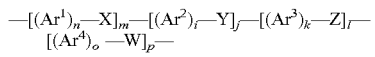

wherein, $Ar^1$, $Ar^2$, $Ar^3$, and $Ar^4$ are independently arylene units of 6 to 18 carbon atoms;

W, X, Y, and Z are independently bivalent linking groups selected from —$SO_2$—, —S—, —SO—, —CO—, —O—, —C(O)O— or alkylene or alkylidene groups of 1 to 6 carbon atoms, wherein at least one of the linking groups is —S—; and n, m, i, j, k, l, o, and p are independently 0, 1, 2, 3, or 4, subject to the proviso that their sum total is not less than 2.

The arylene units $Ar^1$, $Ar^2$, $Ar^3$, and $Ar^4$ may be selectively substituted or unsubstituted. Advantageous arylene units are phenylene, biphenylene, naphthylene, anthracene and phenanthrene. The polyarylene sulfide typically includes more than about 30 mol %, more than about 50 mol %, or more than about 70 mol % arylene sulfide (—S—) units. For example, the polyarylene sulfide may include at least 85 mol % sulfide linkages attached directly to two aromatic rings. In one particular embodiment, the polyarylene sulfide is a polyphenylene sulfide, defined herein as containing the phenylene sulfide structure —$(C_6H_4—S)_n$— (wherein n is an integer of 1 or more) as a component thereof.

Synthesis techniques that may be used in making a polyarylene sulfide are generally known in the art. By way of example, a process for producing a polyarylene sulfide can include reacting a material that provides a hydrosulfide ion (e.g., an alkali metal sulfide) with a dihaloaromatic compound in an organic amide solvent. The alkali metal sulfide can be, for example, lithium sulfide, sodium sulfide, potassium sulfide, rubidium sulfide, cesium sulfide or a mixture thereof. When the alkali metal sulfide is a hydrate or an aqueous mixture, the alkali metal sulfide can be processed according to a dehydrating operation in advance of the polymerization reaction. An alkali metal sulfide can also be generated in situ. In addition, a small amount of an alkali metal hydroxide can be included in the reaction to remove or react impurities (e.g., to change such impurities to harmless materials) such as an alkali metal polysulfide or an alkali metal thiosulfate, which may be present in a very small amount with the alkali metal sulfide.

The dihaloaromatic compound can be, without limitation, an o-dihalobenzene, m-dihalobenzene, p-dihalobenzene, dihalotoluene, dihalonaphthalene, methoxy-dihalobenzene, dihalobiphenyl, dihalobenzoic acid, dihalodiphenyl ether, dihalodiphenyl sulfone, dihalodiphenyl sulfoxide or dihalodiphenyl ketone. Dihaloaromatic compounds may be used either singly or in any combination thereof. Specific exemplary dihaloaromatic compounds can include, without limitation, p-dichlorobenzene; m-dichlorobenzene; o-dichlorobenzene; 2,5-dichlorotoluene; 1,4-dibromobenzene, 1,4-dichloronaphthalene; 1-methoxy-2,5-dichlorobenzene; 4,4'-dichlorobiphenyl; 3,5-dichlorobenzoic acid; 4,4'-dichlorodiphenyl ether; 4,4'-dichlorodiphenylsulfone; 4,4'-dichlorodiphenylsulfoxide; and 4,4'-dichlorodiphenyl ketone. The halogen atom can be fluorine, chlorine, bromine or iodine, and two halogen atoms in the same dihaloaromatic compound may be the same or different from each other. In one embodiment, o-dichlorobenzene, m-dichlorobenzene, p-dichlorobenzene or a mixture of two or more compounds thereof is used as the dihalo-aromatic compound. As is known in the art, it is also possible to use a monohalo compound (not necessarily an aromatic compound) in combination with the dihaloaromatic compound in order to form end groups of the polyarylene sulfide or to regulate the polymerization reaction and/or the molecular weight of the polyarylene sulfide.

The polyarylene sulfide(s) may be homopolymers or copolymers. For instance, selective combination of dihaloaromatic compounds can result in a polyarylene sulfide copolymer containing not less than two different units. For instance, when p-dichlorobenzene is used in combination with m-dichlorobenzene or 4,4'-dichlorodiphenylsulfone, a polyarylene sulfide copolymer can be formed containing segments having the structure of formula:

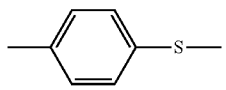

and segments having the structure of formula:

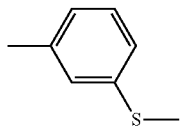

or segments having the structure of formula:

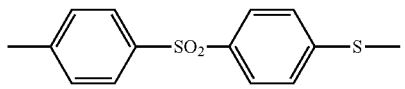

The polyarylene sulfide(s) may be linear, semi-linear, branched or crosslinked. Linear polyarylene sulfides typically contain 80 mol % or more of the repeating unit —(Ar—S)—. Such linear polymers may also include a small amount of a branching unit or a cross-linking unit, but the amount of branching or cross-linking units is typically less than about 1 mol % of the total monomer units of the polyarylene sulfide. A linear polyarylene sulfide polymer may be a random copolymer or a block copolymer containing the above-mentioned repeating unit. Semi-linear polyarylene sulfides may likewise have a cross-linking structure or a branched structure introduced into the polymer a small amount of one or more monomers having three or more reactive functional groups. By way of example, monomer components used in forming a semi-linear polyarylene sulfide can include an amount of polyhaloaromatic compounds having two or more halogen substituents per molecule which can be utilized in preparing branched polymers. Such monomers can be represented by the formula $R'X_n$, where each X is selected from chlorine, bromine, and iodine, n is an integer of 3 to 6, and $R'$ is a polyvalent aromatic radical of valence n which can have up to about 4 methyl substituents, the total number of carbon atoms in $R'$ being within the range of 6 to about 16. Examples of some polyhaloaromatic compounds having more than two halogens substituted per molecule that can be employed in forming a semi-linear polyarylene sulfide include 1,2,3-trichlorobenzene, 1,2,4-trichlorobenzene, 1,3-dichloro-5-bromobenzene, 1,2,4-triiodobenzene, 1,2,3,5-tetrabromobenzene, hexachlorobenzene, 1,3,5-trichloro-2,4,6-trimethylbenzene, 2,2',4,4'-tetrachlorobiphenyl, 2,2',5,5'-tetra-iodobiphenyl, 2,2',6,6'-tetrabromo-3,3',5,5'-tetramethylbiphenyl, 1,2,3,4-tetrachloronaphthalene, 1,2,4-tribromo-6-methylnaphthalene, etc., and mixtures thereof.

B. Impact Modifier

Impact modifiers typically constitute from about 1 wt. % to about 40 wt. %, in some embodiments from about 2 wt. % to about 30 wt. %, and in some embodiments, from about 3 wt. % to about 25 wt. % of the polymer composition. Any of a variety of impact modifiers may be employed, such as epoxy-functionalized polymers, polyurethanes, polybutadiene, acrylonitrile-butadiene-styrene, polyamides, block copolymers (e.g., polyether-polyamide block copolymers), etc., as well as mixtures thereof. In particular embodiments, the impact modifier may include an olefin copolymer that is "epoxy-functionalized" in that it contains, on average, two or more epoxy functional groups per molecule. The copolymer generally contains an olefinic monomeric unit that is derived from one or more α-olefins. Examples of such monomers include, for instance, linear and/or branched α-olefins having from 2 to 20 carbon atoms and typically from 2 to 8 carbon atoms. Specific examples include ethylene, propylene, 1-butene; 3-methyl-1-butene; 3,3-dimethyl-1-butene; 1-pentene; 1-pentene with one or more methyl, ethyl or propyl substituents; 1-hexene with one or more methyl, ethyl or propyl substituents; 1-heptene with one or more methyl, ethyl or propyl substituents; 1-octene with one or more methyl, ethyl or propyl substituents; 1-nonene with one or more methyl, ethyl or propyl substituents; ethyl, methyl or dimethyl-substituted 1-decene; 1-dodecene; and styrene. Particularly desired α-olefin monomers are ethylene and propylene. The copolymer may also contain an epoxy-functional monomeric unit. One example of such a unit is an epoxy-functional (meth)acrylic monomeric component. As used herein, the term "(meth)acrylic" includes acrylic and methacrylic monomers, as well as salts or esters thereof, such as acrylate and methacrylate monomers. For example, suitable epoxy-functional (meth)acrylic monomers may include, but are not limited to, those containing 1,2-epoxy groups, such as glycidyl acrylate and glycidyl methacrylate. Other suitable epoxy-functional monomers include allyl glycidyl ether, glycidyl ethacrylate, and glycidyl itoconate. Other suitable monomers may also be employed to help achieve the desired molecular weight.

Of course, the copolymer may also contain other monomeric units as is known in the art. For example, another suitable monomer may include a (meth)acrylic monomer that is not epoxy-functional. Examples of such (meth)acrylic monomers may include methyl acrylate, ethyl acrylate, n-propyl acrylate, i-propyl acrylate, n-butyl acrylate, s-butyl acrylate, i-butyl acrylate, t-butylacrylate, n-amyl acrylate, i-amyl acrylate, isobornyl acrylate, n-hexyl acrylate, 2-ethylbutyl acrylate, 2-ethylhexyl acrylate, n-octyl acrylate, n-decyl acrylate, methylcyclohexyl acrylate, cyclopentyl acrylate, cyclohexyl acrylate, methyl methacrylate, ethyl methacrylate, 2-hydroxyethyl methacrylate, n-propyl methacrylate, n-butyl methacrylate, i-propyl methacrylate, i-butyl methacrylate, n-amyl methacrylate, n-hexyl methacrylate, i-amyl methacrylate, s-butyl-methacrylate, t-butyl methacrylate, 2-ethylbutyl methacrylate, methylcyclohexyl methacrylate, cinnamyl methacrylate, crotyl methacrylate, cyclohexyl methacrylate, cyclopentyl methacrylate, 2-ethoxyethyl methacrylate, isobornyl methacrylate, etc., as well as combinations thereof. In one particular embodiment, for example, the copolymer may be a terpolymer formed from an epoxy-functional (meth)acrylic monomeric component, α-olefin monomeric component, and non-epoxy functional (meth)acrylic monomeric component. The copolymer may, for instance, be poly(ethylene-co-butylacrylate-co-glycidyl methacrylate), which has the following structure:

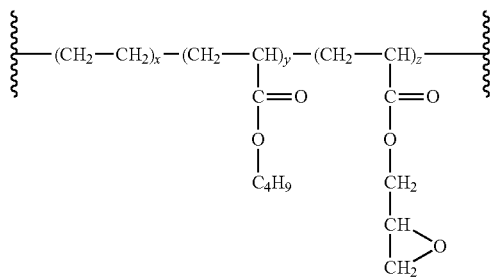

wherein, x, y, and z are 1 or greater.

This amendment updates the structure of paragraph [0014] for clarity purposes and adds no New Matter to the application as originally filed.

The relative portion of the monomeric component(s) may be selected to achieve a balance between epoxy functionality and melt flow rate. More particularly, high epoxy monomer contents can result in good adhesion to metal components, but too high of a content may reduce the melt flow rate to such an extent that the copolymer adversely impacts the melt strength of the polymer blend. Thus, in most embodiments, the epoxy-functional (meth)acrylic monomer(s) constitute from about 1 wt. % to about 20 wt. %, in some embodiments from about 2 wt. % to about 15 wt. %, and in some embodiments, from about 3 wt. % to about 10 wt. % of the copolymer. The α-olefin monomer(s) may likewise constitute from about 55 wt. % to about 95 wt. %, in some embodiments from about 60 wt. % to about 90 wt. %, and in some embodiments, from about 65 wt. % to about 85 wt. % of the copolymer. When employed, other monomeric components (e.g., non-epoxy functional (meth)acrylic monomers) may constitute from about 5 wt. % to about 35 wt. %, in some embodiments from about 8 wt. % to about 30 wt. %, and in some embodiments, from about 10 wt. % to about 25 wt. % of the copolymer. The resulting melt flow rate is typically from about 1 to about 30 grams per 10 minutes ("g/10 min"), in some embodiments from about 2 to about 20 g/10 min, and in some embodiments, from about 3 to about 15 g/10 min, as determined in accordance with ASTM D1238-13 at a load of 2.16 kg and temperature of 190° C.

One example of a suitable epoxy-functionalized copolymer that may be used in the present invention is commercially available from Arkema under the name LOTADER® AX8840. LOTADER® AX8840, for instance, has a melt flow rate of 5 g/10 min and is a random copolymer of ethylene and a glycidyl methacrylate (monomer content of 8 wt. %). Another suitable copolymer is commercially available from Arkema under the name LOTADER® AX8900, which is a terpolymer of ethylene, acrylic ester, and glycidyl methacrylate and has a melt flow rate of 6 g/10 min and a glycidyl methacrylate monomer content of 8 wt. %.

C. Inorganic Fibers

Inorganic fibers typically constitute from about 1 wt. % to about 50 wt. %, in some embodiments from about 2 wt. % to about 40 wt. %, and in some embodiments, from about 5 wt. % to about 30 wt. % of the polymer composition. Any of a variety of different types of inorganic fibers may generally be employed, such as those that are derived from glass; silicates, such as neosilicates, sorosilicates, inosilicates (e.g., calcium inosilicates, such as wollastonite; calcium magnesium inosilicates, such as tremolite; calcium magnesium iron inosilicates, such as actinolite; magnesium iron inosilicates, such as anthophyllite; etc.), phyllosilicates (e.g., aluminum phyllosilicates, such as palygorskite), tectosilicates, etc.; sulfates, such as calcium sulfates (e.g., dehydrated or anhydrous gypsum); mineral wools (e.g., rock or slag wool); and so forth. Glass fibers are particularly suitable for use in the present invention, such as those formed from E-glass, A-glass, C-glass, D-glass, AR-glass, R-glass, S1-glass, S2-glass, etc., as well as mixtures thereof. If desired, the glass fibers may be provided with a sizing agent or other coating as is known in the art.

The inorganic fibers employed in the polymer composition generally have a relatively flat cross-sectional dimension in that they have an aspect ratio (i.e., cross-sectional width divided by cross-sectional thickness) of from about 1.5 to about 10, in some embodiments from about 2 to about 8, and in some embodiments, from about 3 to about 5. The inorganic fibers may, for example, have a nominal width of from about 1 to about 50 micrometers, in some embodiments from about 5 to about 50 micrometers, and in some embodiments, from about 10 to about 35 micrometers. The fibers may also have a nominal thickness of from about 0.5 to about 30 micrometers, in some embodiments from about 1 to about 20 micrometers, and in some embodiments, from about 3 to about 15 micrometers. Further, the inorganic fibers may have a narrow size distribution. That is, at least about 60% by volume of the fibers, in some embodiments at least about 70% by volume of the fibers, and in some embodiments, at least about 80% by volume of the fibers may have a width and/or thickness within the ranges noted above. The volume average length of the glass fibers may be from about 10 to about 500 micrometers, in some embodiments from about 100 to about 400 micrometers, and in some embodiments, from about 150 to about 350 micrometers.

D. Other Components

In addition to a polyarylene sulfide, impact modifier, and inorganic fibers, the polymer composition may also contain a variety of other different components to help improve its overall properties. In certain embodiments, for instance, the polymer composition may contain an epoxy resin, which can undergo a crosslinking reaction with the impact modifier (e.g., epoxy-functionalized olefin copolymer), thus improving compatibility of the components and increasing the mechanical properties of the resulting composition. When employed, such epoxy resins typically constitute from about 0.01 wt. % to about 3 wt. %, in some embodiments from about 0.05 wt. % to about 2 wt. %, and in some embodiments, from about 0.1 to about 1 wt. % of the polymer composition. Epoxy resins have a certain epoxy equivalent weight may be particularly effective for use in the present invention. Namely, the epoxy equivalent weight is generally from about 250 to about 1,500, in some embodiments from about 400 to about 1,000, and in some embodiments, from about 500 to about 800 grams per gram equivalent as determined in accordance with ASTM D1652-11e1. The epoxy resin also typically contains, on the average, at least about 1.3, in some embodiments from about 1.6 to about 8, and in some embodiments, from about 3 to about 5 epoxide groups per molecule. The epoxy resin also typically has a relatively low dynamic viscosity, such as from about 1 centipoise to about 25 centipoise, in some embodiments 2 centipoise to about 20 centipoise, and in some embodiments, from about 5 centipoise to about 15 centipoise, as determined in accordance with ASTM D445-15 at a temperature of 25° C. At room temperature (25° C.), the epoxy resin is also typically a solid or semi-solid material having a melting point of from about 50° C. to about 120° C., in some embodiments from about 60° C. to about 110° C., and in some embodiments, from about 70° C. to about 100° C.

The epoxy resin can be saturated or unsaturated, linear or branched, aliphatic, cycloaliphatic, aromatic or heterocyclic, and may bear substituents which do not materially interfere with the reaction with the oxirane. Suitable epoxy resins include, for instance, glycidyl ethers (e.g., diglycidyl ether) that are prepared by reacting an epichlorohydrin with a hydroxyl compound containing at least 1.5 aromatic hydroxyl groups, optionally under alkaline reaction conditions. Dihydroxyl compounds are particularly suitable. For instance, the epoxy resin may be a diglycidyl ether of a dihydric phenol, diglycidyl ether of a hydrogenated dihydric phenol, etc. Diglycidyl ethers of dihydric phenols may be formed, for example, by reacting an epihalohydrin with a dihydric phenol. Examples of suitable dihydric phenols include, for instance, 2,2-bis(4-hydroxyphenyl) propane ("bisphenol A"); 2,2-bis 4-hydroxy-3-tert-butylphenyl) propane; 1,1-bis(4-hydroxyphenyl) ethane; 1,1-bis(4-hydroxyphenyl) isobutane; bis(2-hydroxy-1-naphthyl) methane; 1,5 dihydroxynaphthalene; 1,1-bis(4-hydroxy-3-alkylphenyl) ethane, etc. Suitable dihydric phenols can also be obtained from the reaction of phenol with aldehydes, such as formaldehyde) ("bisphenol F"). Commercial available examples of such epoxy resins may include EPON™ Resins available from Hexion, Inc. under the designations 862, 828, 826, 825, 1001, 1002, SU3, 154, 1031, 1050, 133, and 165.

Particulate fillers may also be employed in the polymer composition. When employed, particulate fillers typically constitute from about 5 wt. % to about 60 wt. %, in some embodiments from about 10 wt. % to about 50 wt. %, and in some embodiments, from about 15 wt. % to about 45 wt. % of the polymer composition. Various types of particulate fillers may be employed as is known in the art. Clay minerals, for instance, may be particularly suitable for use in the present invention. Examples of such clay minerals include, for instance, talc ($Mg_3Si_4O_{10}(OH)_2$), halloysite ($Al_2Si_2O_5(OH)_4$), kaolinite ($Al_2Si_2O_5(OH)_4$), illite (($K, H_3O)(Al,Mg,Fe)_2$ $(Si,Al)_4O_{10}[(OH)_2,(H_2O)]$), montmorillonite ($(Na,Ca)_{0.33}(Al,Mg)_2Si_4O_{10}(OH)_2 \cdot nH_2O$), vermiculite (($(MgFe,Al)_3(Al,Si)_4O_{10}(OH)_2 \cdot 4H_2O$), palygorskite (($(Mg, Al)_2Si_4O_{10}(OH)_4(H_2O)$), pyrophyllite ($Al_2Si_4O_{10}(OH)_2$), etc., as well as combinations thereof. In lieu of, or in addition to, clay minerals, still other mineral fillers may also be employed. For example, other suitable silicate fillers may also be employed, such as calcium silicate, aluminum silicate, mica, diatomaceous earth, wollastonite, and so forth. Mica, for instance, may be a particularly suitable mineral for use in the present invention. There are several chemically distinct mica species with considerable variance in geologic occurrence, but all have essentially the same crystal structure. As used herein, the term "mica" is meant to generically include any of these species, such as muscovite ($KAl_2(AlSi_3)O_{10}(OH)_2$), biotite ($K(Mg,Fe)_3(AlSi_3)O_{10}(OH)_2$), phlogopite ($KMg_3(AlSi_3)O_{10}(OH)_2$), lepidolite ($K(Li,Al)_2$-$3(AlSi_3)O_{10}(OH)_2$), glauconite ($(K,Na)(Al,Mg,Fe)_2(Si,Al)_4O_{10}(OH)_2$), etc., as well as combinations thereof.

A disulfide compound may also be employed in certain embodiments that can undergo a chain scission reaction with the polyarylene sulfide during melt processing to lower its overall melt viscosity. When employed, disulfide compounds typically constitute from about 0.01 wt. % to about 3 wt. %, in some embodiments from about 0.02 wt. % to about 1 wt. %, and in some embodiments, from about 0.05 to about 0.5 wt. % of the polymer composition. The ratio of the amount of the polyarylene sulfide to the amount of the disulfide compound may likewise be from about 1000:1 to about 10:1, from about 500:1 to about 20:1, or from about 400:1 to about 30:1. Suitable disulfide compounds are typically those having the following formula:

$R^3$—S—S—$R^4$ wherein $R^3$ and $R^4$ may be the same or different and are hydrocarbon groups that independently include from 1 to about 20 carbons. For instance, $R^3$ and $R^4$ may be an alkyl, cycloalkyl, aryl, or heterocyclic group. In certain embodiments, $R^3$ and $R^4$ are generally nonreactive functionalities, such as phenyl, naphthyl, ethyl, methyl, propyl, etc. Examples of such compounds include diphenyl disulfide, naphthyl disulfide, dimethyl disulfide, diethyl disulfide, and dipropyl disulfide. $R^3$ and $R^4$ may also include reactive functionality at terminal end(s) of the disulfide compound. For example, at least one of $R^3$ and $R^4$ may include a terminal carboxyl group, hydroxyl group, a substituted or non-substituted amino group, a nitro group, or the like. Examples of compounds may include, without limitation, 2,2'-diaminodiphenyl disulfide, 3,3'-diaminodiphenyl disulfide, 4,4'-diaminodiphenyl disulfide, dibenzyl disulfide, dithiosalicyclic acid (or 2,2'-dithiobenzoic acid), dithioglycolic acid, α,α'-dithiodilactic acid, β,β'-dithiodilactic acid, 3,3'-dithiodipyridine, 4,4'dithiomorpholine, 2,2'-dithiobis(benzothiazole), 2,2'-dithiobis(benzimidazole), 2,2'-dithiobis(benzoxazole), 2-(4'-morpholinodithio)benzothiazole, etc., as well as mixtures thereof.

If desired, a nucleating agent may also be employed to further enhance the crystallization properties of the composition. One example of such a nucleating agent is an inorganic crystalline compound, such as boron-containing compounds (e.g., boron nitride, sodium tetraborate, potassium tetraborate, calcium tetraborate, etc.), alkaline earth metal carbonates (e.g., calcium magnesium carbonate), oxides (e.g., titanium oxide, aluminum oxide, magnesium oxide, zinc oxide, antimony trioxide, etc.), silicates (e.g., talc, sodium-aluminum silicate, calcium silicate, magnesium silicate, etc.), salts of alkaline earth metals (e.g., calcium carbonate, calcium sulfate, etc.), and so forth. Boron nitride (BN) has been found to be particularly beneficial when employed in the polymer composition of the present invention. Boron nitride exists in a variety of different crystalline forms (e.g., h-BN—hexagonal, c-BN—cubic or spharlerite, and w-BN-wurtzite), any of which can generally be employed in the present invention. The hexagonal crystalline form is particularly suitable due to its stability and softness.

If desired, other polymers may also be employed in the polymer composition for use in combination with the polyarylene sulfide. When employed, such additional polymers typically constitute from about 0.1 wt. % to about 30 wt. %, in some embodiments from about 0.5 wt. % to about 20 wt. %, and in some embodiments, from about 1 wt. % to about 10 wt. % of the polymer composition. Any of a variety of polymers may be employed, such as polyimides, polyamides, polyetherimides, polyarylene ether ketones, polyesters, etc. In one particular embodiment, a liquid crystalline polymer may be employed. The term "liquid crystalline polymer" generally refers to a polymer that can possess a rod-like structure that allows it to exhibit liquid crystalline behavior in its molten state (e.g., thermotropic nematic state). The polymer may contain aromatic units (e.g., aromatic polyesters, aromatic polyesteramides, etc.) so that it is wholly aromatic (e.g., containing only aromatic units) or partially aromatic (e.g., containing aromatic units and other units, such as cycloaliphatic units). Liquid crystalline polymers are generally classified as "thermotropic" to the extent that they can possess a rod-like structure and exhibit a crystalline behavior in their molten state (e.g., thermotropic nematic state). Because thermotropic liquid crystalline polymers form an ordered phase in the melt state, they can have a relatively low shear viscosity and thus sometimes act as a flow aid for the polyarylene sulfide. The liquid crystalline polymer may also help in further improving certain mechanical properties of the polymer composition.

The liquid crystalline polymers may be formed from one or more types of repeating units as is known in the art. The liquid crystalline polymers may, for example, contain one or more aromatic ester repeating units, typically in an amount of from about 60 mol. % to about 99.9 mol. %, in some embodiments from about 70 mol. % to about 99.5 mol. %, and in some embodiments, from about 80 mol. % to about 99 mol. % of the polymer. Examples of aromatic ester repeating units that are suitable for use in the present invention may include, for instance, aromatic dicarboxylic repeating units, aromatic hydroxycarboxylic repeating units, as well as various combinations thereof.

Still other components that can be included in the composition may include, for instance, organosilane coupling agents, antimicrobials, pigments (e.g., black pigments), antioxidants, stabilizers, surfactants, waxes, flow promoters, solid solvents, flame retardants, and other materials added to enhance properties and processability.

The manner in which the polyarylene sulfide, inorganic fibers, impact modifier, and other optional additives are combined may vary as is known in the art. For instance, the materials may be supplied either simultaneously or in sequence to a melt processing device that dispersively blends the materials. Batch and/or continuous melt processing techniques may be employed. For example, a mixer/kneader, Banbury mixer, Farrel continuous mixer, single-screw extruder, twin-screw extruder, roll mill, etc., may be utilized to blend and melt process the materials. One particularly suitable melt processing device is a co-rotating, twin-screw extruder (e.g., Leistritz co-rotating fully intermeshing twin screw extruder). Such extruders may include feeding and venting ports and provide high intensity distributive and dispersive mixing. For example, the components may be fed to the same or different feeding ports of a twin-screw extruder and melt blended to form a substantially homogeneous melted mixture. Melt blending may occur under high shear/pressure and heat to ensure sufficient dispersion. For example, melt processing may occur at a temperature of from about 50° C. to about 500° C., and in some embodiments, from about 100° C. to about 250° C. Likewise, the apparent shear rate during melt processing may range from about 100 seconds$^{-1}$ to about 10,000 seconds$^{-1}$, and in some embodiments, from about 500 seconds$^{-1}$ to about 1,500 seconds$^{-1}$. Of course, other variables, such as the residence time during melt processing, which is inversely proportional to throughput rate, may also be controlled to achieve the desired degree of homogeneity.

If desired, one or more distributive and/or dispersive mixing elements may be employed within the mixing section of the melt processing unit. Suitable distributive mixers may include, for instance, Saxon, Dulmage, Cavity Transfer mixers, etc. Likewise, suitable dispersive mixers may include Blister ring, Leroy/Maddock, CRD mixers, etc. As is well known in the art, the mixing may be further increased in aggressiveness by using pins in the barrel that create a folding and reorientation of the polymer melt, such as those used in Buss Kneader extruders, Cavity Transfer mixers, and Vortex Intermeshing Pin mixers. The speed of the screw can also be controlled to improve the characteristics of the composition. For instance the screw speed can be about 400 rpm or less, in one embodiment, such as between about 200 rpm and about 350 rpm, or between about 225 rpm and about 325 rpm. In one embodiment, the compounding conditions can be balanced so as to provide a polymer composition that exhibits improved impact and tensile properties. For example, the compounding conditions can include a screw design to provide mild, medium, or aggressive screw conditions. For example, system can have a mildly aggressive screw design in which the screw has one single melting section on the downstream half of the screw aimed towards gentle melting and distributive melt homogenization. A medium aggressive screw design can have a stronger melting section upstream from the filler feed barrel focused more on stronger dispersive elements to achieve uniform melting. Additionally it can have another gentle mixing section downstream to mix the fillers. This section, although weaker, can still add to the shear intensity of the screw to make it stronger overall than the mildly aggressive design. A highly aggressive screw design can have the strongest shear intensity of the three. The main melting section can be composed of a long array of highly dispersive kneading blocks. The downstream mixing section can utilize a mix of distributive and intensive dispersive elements to achieve uniform dispersion of all type of fillers. The shear intensity of the highly aggressive screw design can be significantly higher than the other two designs. In one embodiment, a system can include a medium to aggressive screw design with relatively mild screw speeds (e.g., between about 200 rpm and about 300 rpm).

Regardless of the manner in which they are combined together, the present inventors have discovered that the polymer composition may possess a relatively low melt viscosity, which allows it to readily flow during production of the part. For instance, the composition may have a melt viscosity of about 5,000 poise or less, in some embodiments about 2,500 poise or less, in some embodiments about 2,000 poise or less, and in some embodiments, from about 50 to about 1,000 poise, as determined by a capillary rheometer at a temperature of about 316° C. and shear rate of 1,200 seconds$^{-1}$. Among other things, these viscosity properties can allow the composition to be readily shaped into parts having a small dimension.

Due to the relatively low melt viscosity that can be achieved in the present invention, relatively high molecular weight polyarylene sulfides can also be fed to the extruder with little difficulty. For example, such high molecular weight polyarylene sulfides may have a number average molecular weight of about 14,000 grams per mole ("g/mol")

or more, in some embodiments about 15,000 g/mol or more, and in some embodiments, from about 16,000 g/mol to about 60,000 g/mol, as well as weight average molecular weight of about 35,000 g/mol or more, in some embodiments about 50,000 g/mol or more, and in some embodiments, from about 60,000 g/mol to about 90,000 g/mol, as determined using gel permeation chromatography as described below. One benefit of using such high molecular weight polymers is that they generally have a low chlorine content. In this regard, the resulting polymer composition may have a low chlorine content, such as about 1,200 ppm or less, in some embodiments about 1,000 ppm or less, in some embodiments from 0 to about 900 ppm, and in some embodiments, from about 1 to about 600 ppm.

In addition, the crystallization temperature (prior to being incorporated into the composite structure) of the polymer composition may about 250° C. or less, in some embodiments from about 100° C. to about 245° C., and in some embodiments, from about 150° C. to about 240° C. The melting temperature of the polymer composition may also range from about 250° C. to about 320° C., and in some embodiments, from about 260° C. to about 300° C. The melting and crystallization temperatures may be determined as is well known in the art using differential scanning calorimetry in accordance with ISO Test No. 11357:2007. Even at such melting temperatures, the ratio of the deflection temperature under load ("DTUL"), a measure of short term heat resistance, to the melting temperature may still remain relatively high. For example, the ratio may range from about 0.65 to about 1.00, in some embodiments from about 0.70 to about 0.99, and in some embodiments, from about 0.80 to about 0.98. The specific DTUL values may, for instance, range from about 200° C. to about 300° C., in some embodiments from about 210° C. to about 290° C., and in some embodiments, from about 220° C. to about 280° C. Such high DTUL values can, among other things, allow the use of high speed processes often employed during the manufacture of components having a small dimensional tolerance.

II. Metal Component

The metal component may contain any of a variety of different metals, such as aluminum, stainless steel, magnesium, nickel, chromium, copper, titanium, and alloys thereof. The component may have a variety of forms, such as a sheet, insert, plate, etc. If desired, the metal component may optionally be pretreated to increase the degree of surface indentations and surface area. To improve adhesion, the surface indentations (or pores) may have a relatively small average size, such as about 20 micrometers or less, in some embodiments about 10 micrometers or less, and in some embodiments, from about 10 nanometers to about 1 micrometer. The formation of such surface indendations may be accomplished using mechanical techniques (e.g., sandblasting, grinding, flaring, punching, molding, etc.) and/or chemical techniques (e.g., etching, anodic oxidation, etc.). For instance, techniques for anodically oxidizing a metal surface are described in more detail in U.S. Pat. No. 7,989,079 to Lee, et al. In addition to pretreating the surface, the metal component may also be preheated at a temperature close to, but below the melt temperature of the polymer composition. This may be accomplished using a variety of methods, such as contact heating, radiant gas heating, infrared heating, convection or forced convection air heating, induction heating, microwave heating or combinations thereof.

III. Molding Technique

To form the composite structure, the polymer composition used to form the resinous component is typically injected into a mold that contains the optionally pretreated metal component. As is known in the art, injection can occur in two main phases—i.e., an injection phase and holding phase. During the injection phase, the mold cavity is filled with the molten polymer composition so that it covers a portion or the entire surface of the metal component. The holding phase is initiated after completion of the injection phase in which the holding pressure is controlled to pack additional material into the cavity and compensate for volumetric shrinkage that occurs during cooling. After the shot has built, it can then be cooled. Once cooling is complete, the molding cycle is completed when the mold opens and the part is ejected, such as with the assistance of ejector pins within the mold.

Once formed into the desired shape, the composite structure is allowed to cool so that the resinous component becomes firmly adhered to the metal component. The ability of the resinous component to remain adhered to the metal component may be characterized by the tensile shear strength of the structure, which can be determined in accordance with ISO Test No. 19095-2015 at a temperature of 23° C. More particularly, the composite structure of the present invention may exhibit a tensile shear strength of about 1,000 Newtons (N) or more, in some embodiments about 1,200 N or more, in some embodiments about 1,500 N or more, and in some embodiments, from about 1,700 to 5,000 N.

The resulting composite structure has also been found to possess excellent mechanical properties. For example, the present inventors have discovered that the impact strength can be significantly improved, which is useful in certain types of articles (e.g., portable electronic devices). The composite structure may, for instance, exhibit a Charpy notched impact strength of about 5 kJ/m$^2$ or more, in some embodiments from about 8 to about 40 kJ/m$^2$, and in some embodiments, from about 10 to about 30 kJ/m$^2$, measured at 23° C. according to ISO Test No. 179-1:2010) (technically equivalent to ASTM D256-12, Method B). Despite the fact that the polymer composition has a low melt viscosity and high impact strength, the present inventors have also discovered that the tensile and flexural mechanical properties are not adversely impacted. For example, the composite structure may exhibit a tensile strength of from about 20 to about 500 MPa, in some embodiments from about 50 to about 400 MPa, and in some embodiments, from about 100 to about 350 MPa; a tensile break strain of about 0.5% or more, in some embodiments from about 0.6% to about 10%, and in some embodiments, from about 0.8% to about 3.5%; and/or a tensile modulus of from about 3,000 MPa to about 30,000 MPa, in some embodiments from about 4,000 MPa to about 25,000 MPa, and in some embodiments, from about 5,000 MPa to about 22,000 MPa. The tensile properties may be determined in accordance with ISO Test No. 527:2012 (technically equivalent to ASTM D638-14) at 23° C. The structure may also exhibit a flexural strength of from about 20 to about 500 MPa, in some embodiments from about 50 to about 400 MPa, and in some embodiments, from about 100 to about 350 MPa; a flexural break strain of about 0.5% or more, in some embodiments from about 0.6% to about 10%, and in some embodiments, from about 0.8% to about 3.5%; and/or a flexural modulus of from about 3,000 MPa to about 30,000 MPa, in some embodiments from about 4,000 MPa to about 25,000 MPa, and in some embodiments, from about 5,000 MPa to about 22,000 MPa. The flexural properties may be determined in accordance with ISO Test No. 178:2010 (technically equivalent to ASTM D790-10) at 23° C.

IV. Articles

As noted, various articles may employ the composite structure and/or molded part of the present invention. One such article is a portable electronic device, which may contain a frame or housing that includes a molded part formed according to the present invention. Examples of portable electronic devices that may employ such a molded part in or as its housing include, for instance, cellular telephones, portable computers (e.g., laptop computers, netbook computers, tablet computers, etc.), wrist-watch devices, headphone and earpiece devices, media players with wireless communications capabilities, handheld computers (also sometimes called personal digital assistants), remote controllers, global positioning system (GPS) devices, handheld gaming devices, camera modules, integrated circuits (e.g., SIM cards), etc. Wireless portable electronic devices are particularly suitable. Examples of such devices may include a laptop computer or small portable computer of the type that is sometimes referred to as "ultraportables." In one suitable arrangement, the portable electronic device may be a handheld electronic device. The article may also be a hybrid device that combines the functionality of multiple conventional devices. Examples of hybrid articles include a cellular telephone that includes media player functionality, a gaming device that includes a wireless communications capability, a cellular telephone that includes game and email functions, and a handheld device that receives email, supports mobile telephone calls, has music player functionality and supports web browsing.

It should also be understood that the composite structure of the present invention may be used in a wide variety of other types of articles. For example, the composite structure may be used in components such as bearings, electrical sensors, coils (e.g., pencil, ignition, etc.), clamps (e.g., hose clamps), valves, capacitors, switches, electrical connectors, printer parts, pumps (e.g., gear pumps, pump impellers, pump housings, etc.), dashboards, pipes, hoses, etc.

The present invention may be better understood with reference to the following examples.

Test Methods

Melt Viscosity: The melt viscosity (Pa-s) may be determined in accordance with ISO Test No. 11443:2005 at a shear rate of 1200 s$^{-1}$ or 400 s$^{-1}$ and using a Dynisco LCR7001 capillary rheometer. The rheometer orifice (die) may have a diameter of 1 mm, length of 20 mm, L/D ratio of 20.1, and an entrance angle of 180°. The diameter of the barrel may be 9.55 mm+0.005 mm and the length of the rod was 233.4 mm. The melt viscosity is typically determined at a temperature at least 15° C. above the melting temperature, such as 316° C.

Melting Temperature: The melting temperature ("Tm") may be determined by differential scanning calorimetry ("DSC") as is known in the art. For semi-crystalline and crystalline materials, the melting temperature is the differential scanning calorimetry (DSC) peak melt temperature as determined by ISO Test No. 11357-2:2013. Under the DSC procedure, samples were heated and cooled at 20° C. per minute as stated in ISO Standard 10350 using DSC measurements conducted on a TA Q2000 Instrument.

Deflection Temperature Under Load ("DTUL"): The deflection under load temperature may be determined in accordance with ISO Test No. 75-2:2013 (technically equivalent to ASTM D648-07). More particularly, a test strip sample having a length of 80 mm, thickness of 10 mm, and width of 4 mm may be subjected to an edgewise three-point bending test in which the specified load (maximum outer fibers stress) was 1.8 Megapascals. The specimen may be lowered into a silicone oil bath where the temperature is raised at 2° C. per minute until it deflects 0.25 mm (0.32 mm for ISO Test No. 75-2:2013).

Tensile Modulus, Tensile Stress, and Tensile Elongation at Break: Tensile properties may be tested according to ISO Test No. 527:2012 (technically equivalent to ASTM D638-14). Modulus and strength measurements may be made on the same test strip sample having a length of 80 mm, thickness of 10 mm, and width of 4 mm. The testing temperature may be 23° C., and the testing speeds may be 5 mm/min.

Flexural Modulus, Flexural Stress, and Flexural Break Strain: Flexural properties may be tested according to ISO Test No. 178:2010 (technically equivalent to ASTM D790-10). This test may be performed on a 64 mm support span. Tests may be run on the center portions of uncut ISO 3167 multi-purpose bars. The testing temperature may be 23° C. and the testing speed may be 2 mm/min.

Notched Charpy Impact Strength: Notched Charpy properties may be tested according to ISO Test No. ISO 179-1: 2010) (technically equivalent to ASTM D256-10, Method B). This test may be run using a Type A notch (0.25 mm base radius) and Type 1 specimen size (length of 80 mm, width of 10 mm, and thickness of 4 mm). Specimens may be cut from the center of a multi-purpose bar using a single tooth milling machine. The testing temperature may be 23° C.

Chlorine Content: Chlorine content may be determined according to an elemental analysis analysis using Parr Bomb combustion followed by Ion Chromatography.

Adhesion Testing: The ability of a resinous component to adhere to a metal component may be determined by testing the tensile shear strength of a composite sample. The test sample may have a length of 80 mm, thickness of 10 mm, and width of 4 mm. The testing temperature may be 23° C., and the maximum testing speed may be 50 mm/min. The test may be performed in accordance with ISO Test No. 19095-2015 using an INSTRON™ 5969 dual column tensile tester. The tensile shear strength is recorded as the maximum force that is reached before breaking the specimen.

Adhesion Testing: The ability of a molded part to adhere to a metal component may be determined by testing the tensile shear strength of a composite sample. Test specimens may be prepared by injection molding process utilizing a three plate mold with specific cavity structures. Pre-treated aluminum metal inserts are embedded in the mold and molten plastic is then injected into the cavities and adhered to the metal parts. As the plastic cools down in the mold, the integrated parts are released from the mold. All specimens are conditioned before testing. Injection molding may be performed on a FANUC Roboshot s-2000i 100B. Barrel temperature may be set to ensure that the plastic melt temperature is around 320° C. The mold temperature may be 140° C., the screw speed may be 50 rpm, the injection speed may be 150 mm/s, and the hold pressure may be 1,000 bar. The test sample may have a length of 80 mm, thickness of 10 mm, and width of 4 mm. The testing temperature may be 23° C., and the maximum testing speed may be 50 mm/min. The test may be performed in accordance with ISO Test No. 19095-2015 using an INSTRON™ 5969 dual column tensile tester. The tensile shear strength is recorded as the maximum force that is reached before breaking the specimen.

Example 1

The components listed in Table 1 below are mixed in a Werner Pfleiderer ZSK 25 co-rotating intermeshing twin-screw extruder with a 32 mm diameter.

TABLE 1

| Ingredient | Sample 1 (wt. %) | Sample 2 (wt. %) | Sample 3 (wt. %) |
|---|---|---|---|
| Flat Glass Fibers (RENEX ™ FF 5061, Taishan) | 20.0 | 20 | 20 |
| Black Concentrate | 2.5 | 2.5 | 2.5 |
| Epoxy Resin (EPON ™ 1002F, Hexion) | 0.5 | 0.5 | 0.5 |
| LOTADER ® AX 8900 | 8.0 | — | 8.0 |
| Elvaloy PTW | — | 8.0 | — |
| 2,2'-dithiodibenzoic acid | — | — | 0.05 |
| FORTRON ® 0205 | 5.0 | 5.0 | 4.95 |
| FORTRON ® 0214 | 64.0 | 64.0 | 64.0 |

The resulting pellets are injection molded on a Mannesmann Demag D100 NCIII injection molding machine and tested for certain physical characteristics, as provided in Table 2 below.

TABLE 2

| Property | Sample 1 | Sample 2 | Sample 3 |
|---|---|---|---|
| Melt Viscosity at 1,200 s$^{-1}$ (Pa-s) | 550 | 415 | 450 |
| Tensile Modulus (MPa) | 7,246 | 7,387 | 7,163 |
| Tensile Break Stress (MPa) | 113 | 117 | 117 |
| Tensile Break Elongation (%) | 2.4 | 2.5 | 2.5 |
| Charpy Notched Impact Strength (kJ/m$^2$) | 18 | 18 | 17 |
| Flexural Modulus (MPa) | 6,891 | 6,896 | 7,042 |
| Flexural Break Stress (MPa) | 178 | 180 | 178 |
| Tensile Shear Strength (N) | 1,818 | 1,522 | 1,586 |
| Standard Deviation for Tensile Shear Strength | 168 | 200 | 136 |

Example 2

The components listed in Table 3 below are mixed in a Werner Pfleiderer ZSK 25 co-rotating intermeshing twin-screw extruder with a 32 mm diameter.

TABLE 3

| Ingredient | Sample 4 (wt. %) | Sample 5 (wt. %) |
|---|---|---|
| Glass Chopped Strand CSG 3PA 830S (Nittobo) | 20 | — |
| Chopped Glass Fibers (ECS 309T-3, Chongqing Polycomp) | — | 20 |
| Black Concentrate | 2.5 | 2.5 |
| Epoxy Resin (EPON ™ 1002F, Hexion) | 0.5 | 0.5 |
| LOTADER ® AX 8900 | 8.0 | 8.0 |
| FORTRON ® 0205 | 5.0 | 5.0 |
| FORTRON ® 0214 | 64.0 | 64.0 |

The resulting pellets are injection molded in a three-plate mold containing slots for metal components (Roboshot S-2000i 1008, available from Fanuc Co.). Aluminum metal inserts (5000 series aluminum) are embedded in the mold and the polymer composition is then injected into the cavities for adhering to the metal inserts. The resulting composite parts are removed from the mold. The parts are then tested for melt viscosity, tensile properties, flexural properties, impact strength, and tensile shear strength as discussed above. The results are set forth below in Table 4.

TABLE 4

| Property | Sample 4 | Sample 5 |
|---|---|---|
| Melt Viscosity at 400 s$^{-1}$ (Pa-s) | 522 | 598 |
| Tensile Modulus (MPa) | 7,031 | 6,990 |
| Tensile Break Stress (MPa) | 115 | 110 |
| Tensile Break Elongation (%) | 2.5 | 2.7 |
| Charpy Notched Impact Strength (kJ/m$^2$) | 18 | 18 |
| Flexural Modulus (MPa) | 6,603 | 6,684 |
| Flexural Break Stress (MPa) | 183 | 177 |
| Tensile Shear Strength (N) | 1,592 | 1,526 |
| Standard Deviation for Tensile Shear Strength | 135 | 84 |

These and other modifications and variations of the present invention may be practiced by those of ordinary skill in the art, without departing from the spirit and scope of the present invention. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed is:

1. A composite structure comprising a resinous component that is adhered to a surface of a metal component, wherein the resinous component is formed from a polymer composition that comprises a polyarylene sulfide, inorganic fibers, an impact modifier that includes an epoxy-functionalized olefin copolymer, and an epoxy resin having a melting temperature of from about 50° C. to about 120° C. and an epoxy equivalent weight of from about 250 to about 1,500 grams per gram equivalent as determined in accordance with ASTM D1652-11e1, wherein the inorganic fibers having an aspect ratio of from about 1.5 to about 10, the aspect ratio being defined as the cross-sectional width of the fibers divided by the cross-sectional thickness of the fibers, wherein the inorganic fibers constitute from about 1 wt. % to about 50 wt. % of the polymer composition, the impact modifier constitutes from about 1 wt. % to about 40 wt. % of the polymer composition, the epoxy resin constitutes from about 0.01 wt. % to 1 wt. % of the polymer composition, and the polyarylene sulfide constitutes from about 35 wt. % to about 95 wt. % of the polymer composition.

2. The composite structure of claim 1, wherein the polyarylene sulfide is a linear polyphenylene sulfide.

3. The composite structure of claim 1, wherein the epoxy-functionalized olefin copolymer contains an ethylene monomeric unit and an epoxy-functional (meth)acrylic monomeric component.

4. The composite structure of claim 3, wherein the epoxy-functional (meth)acrylic monomeric component is derived from glycidyl acrylate, glycidyl methacrylate, or a combination thereof.

5. The composite structure of claim 3, wherein the epoxy-functional (meth)acrylic monomeric unit constitutes from about 1 wt. % to about 20 wt. % of the copolymer.

6. The composite structure of claim 3, wherein the epoxy-functionalized olefin copolymer further contains a (meth)acrylic monomeric component that is not epoxy-functional.

7. The composite structure of claim 1, wherein the inorganic fibers have a width of from about 1 to about 50 micrometers and a thickness of from about 0.5 to about 30 micrometers.

8. The composite structure of claim 1, wherein the inorganic fibers include glass fibers.

9. The composite structure of claim 1, wherein the epoxy resin has an epoxy equivalent weight of from about 250 to about 700 grams per gram equivalent as determined in accordance with ASTM D1652-11e1.

10. The composite structure of claim 9, wherein the epoxy resin is a glycidyl ether formed from an epichlorohydrin and a hydroxyl compound containing at least 1.5 aromatic hydroxyl groups.

11. The composite structure of claim 10, wherein the hydroxyl compound is a dihydric phenol.

12. The composite structure of claim 1, wherein the metal component contains aluminum.

13. The composite structure of claim 1, wherein the metal component contains a plurality of surface indentations having an average size of about 20 micrometers or less.

14. The composite structure of claim 1, wherein the composite structure exhibits a tensile shear strength of about 1,200 Newtons or more, as determined in accordance with ISO Test No. 19095-2015 at a temperature of 23° C.

* * * * *